United States Patent [19]
Jackson

[11] B 3,923,538
[45] Dec. 2, 1975

[54] PRIMROSE CHROME YELLOW PIGMENT AND PROCESS FOR ITS PREPARATION
[75] Inventor: Julius Jackson, Westfield, N.J.
[73] Assignee: E. I. Du Pont de Nemours and Company, Wilmington, Del.
[22] Filed: Jan. 18, 1973
[21] Appl. No.: 324,879
[44] Published under the Trial Voluntary Protest Program on January 28, 1975 as document no. B 324,879.

[52] U.S. Cl. .............................. 106/298; 106/308 B
[51] Int. Cl.² ............................................ C09C 3/00
[58] Field of Search ...................... 106/298, 308 B

[56] References Cited
UNITED STATES PATENTS

| | | | |
|---|---|---|---|
| 2,023,928 | 12/1935 | Lederle et al...................... | 106/298 |
| 2,212,917 | 8/1940 | Horning............................. | 106/298 |
| 2,808,339 | 10/1957 | Jackson............................. | 106/298 |
| 3,370,971 | 2/1968 | Linton............................... | 106/298 |

OTHER PUBLICATIONS

"Color Index," 2nd edition, 1956, published by the Society of Dyers and Colourists, England, and the American Association of Textile Chemists and Colorists, United States.

Primary Examiner—Winston A. Douglas
Assistant Examiner—John P. Sheehan

[57] ABSTRACT

A primrose type chrome yellow pigment of improved thermal stability is prepared. The pigment contains at least one hydrous oxide and an orthorhombic phase lead chromate-lead sulfate solid solution which is low in $CO_2$ content. The solid solution is formed directly without precipitating a $PbCO_3$ intermediate. The pigment may be encapsulated with a dense amorphous silica coating to achieve outstanding thermal stability characteristics.

4 Claims, No Drawings

PRIMROSE CHROME YELLOW PIGMENT AND PROCESS FOR ITS PREPARATION

BACKGROUND OF THE INVENTION

In the manufacture of the so-called "primrose" type of chrome yellow (or lead chromate) base pigments, it has been conventional in the art that they be produced by a series of steps wherein a precipitate of lead carbonate is initially formed and then converted to a stabilized orthorhombic solid solution of lead chromate-lead sulfate by means of a highly acidic reaction medium. Although such pigments have been widely used in finishes, printing inks and the like, they have often tended to be deficient in thermal stability and hence less well suited for applications requiring a high temperature processing step, e.g., as a colorant in plastic extrusions. While the chemical prereduction of lead chromate base pigments can serve to increase thermal stability as well as lightfastness, this is not altogether an attractive solution since the pigment color intensity is deleteriously affected.

One possible explanation for the poor thermal stability properties which characterize certain of the primrose yellow pigments resides in the presence of traces of $CO_2$, as such or as a carbonate, but in either case doubtlessly as a residue from the original lead carbonate precipitate, which is known to darken upon heating. Whatever the explanation be, however, an alternative procedure for the synthesis of such primrose yellow pigments would be highly desirable, particularly if attendant high level thermal stability characteristics were achieved without a significant sacrifice to pigment color intensity.

SUMMARY OF THE INVENTION

In accordance with the invention there is provided a primrose type of chrome yellow base pigment characterized by a high level of thermal stability, particularly when encapsulated with a dense silica coating. The pigment contains 0.5 to 10 weight percent of one or more hydrous oxides, preferably these being composed in part or in whole of hydrous metal oxides, and 90 to 99.5 weight percent of an orthorhombic phase lead chromate-lead sulfate solid solution wherein there is no more than about 0.35, preferably no more than 0.25, weight percent of $CO_2$, calculated as $PbCO_3$. The low amount of $CO_2$ (calculated as $PbCO_3$) compares with commercial primrose pigments which can contain up to several percent of $CO_2$ (calculated as $PbCO_3$) seldom as little as even 0.75 percent.

The primrose type or shade of lead chromate (or chrome yellow) pigments are referred to in "Colour Index," 2nd edition, 1956, published jointly by the Society of Dyers and Colourists, England, and the American Association of Textile Chemists and Colorists, Unites States, under the designation Lead Sulfochromate CI-77603. They are represented by the general formula $PbCrO_4.x\ PbSO_4$ and usually contain 40 to 85 weight percent of lead chromate and 15 to 60 weight percent of $PbSO_4$ in solid solution, the crystal phase of the particles being orthorhombic.

The pigments of the invention are characterized by a high level of thermal stability. It is noteworthy that this is achieved without a chemical reduction having occurred, i.e., without any chemical treatment of the lead chromate-lead sulfate solid solution which would effect a reduction to a lower valence state of the $CrO_4^{-2}$ ions at the surface of the pigment particles. The absence of such a prereduction means that there has been no pre-darkening of the pigment, hence the highly intense primrose shade which characterizes the lead chromate-lead sulfate solid solution base is retained. While such pigments could be subsequently subjected to a chemical reduction, e.g., as in U.S. Pat. No. 2,808,339, to J. Jackson, this would necessarily involve a sacrifice in color intensity.

The above-described pigments of the invention may be prepared by a process that involves:

a. admixing a first aqueous solution containing a soluble lead salt and having a pH of 3.8 to 4.2 with a second aqueous solution having a pH of 6.5 to 7 and containing chromate and sulfate ions, the admixing being conducted in the presence of a combination of acetic acid, $Al^{+3}$ ions, and $P_2O_7^{-4}$ ions to precipitate the solid solutions, as above described, in a stable orthorhombic crystal phase, the composition of the two solutions being selected to produce the solid solution composition in the form of a slurry having a pH of 1.4 to 2, b. adjusting the pH of the aqueous slurry thus formed to 4 to 6 and maintaining it at an elevated temperature of 40° to 80°C. for at least 5 minutes, c. thereafter surface-coating the precipitate with 0.5 to 10 percent, based on the final pigment weight, of at least one hydrous oxide to further enhance lightfastness, and d. filtering the surface-coated precipitate, washing it free of residual ions, drying it, and then heating the pigment for a minimum of 15 minutes to a temperature of at least 110°C. to maximize lightfastness.

As regards the details of the above-described process, step (a) is advantageously performed by admixing an aqueous lead nitrate solution having a pH of about 3.8 to 4.2 with an aqueous solution containing sodium chromate, sodium dichromate and sodium sulfate and having a pH of 6.5 to 7. The presence of small amounts of acetic acid, aluminum ions and pyrophosphate ions is required in the latter solution to insure precipitation of a solid solution in a stable orthorhombic crystal phase. The precipitation of the solid solution, upon mixing the two aqueous solutions, results in a slurry having a pH of 1.4 to 2, preferably 1.4 to 1.8.

According to step (b), the resultant aqueous slurry is adjusted to a pH of 4 to 6 and maintained at an elevated temperature of 40° to 80°C. for at least 5 minutes to perfect the crystal structure of the solid solution particles.

Subsequently, according to step (c), the precipitate is surface-coated with at least one hydrous oxide to further enhance lightfastness. The amount of hydrous oxide so employed should be in the range of 0.5 to 10 percent, based on the final pigment weight. The preferred oxide is alumina, but titania and zirconia can be utilized. Hydrous silica may be used but preferably only in conjunction with one of the aforementioned hydrous metal oxides, as this can be particularly beneficial in terms of enhancing the lightfastness of the resultant pigment.

Finally, in step (d), the precipitate is filtered, washed and dried in the conventional manner. It is essential, however, that in the course of so recovering the pigment it be heated for a period of at least 15 minutes at a temperature of at least 110°C. to maximize lightfastness. Preferably this heating step will be conducted at a temperature of at least 130°C. for a period of one hour.

In any event failure to subject the pigment to this heating step results in a product of inferior qualities.

The novel chrome yellow pigments of the invention are particularly useful when coated with dense amorphous silica as described in Linton U.S. Pat. No. 3,370,971, i.e., to further improve resistance to discoloration upon contact with acids, alkalies, and soap solutions, and upon exposure to light and heat. In the manufacture of such pigments the base particles are treated so as to deposit on their surfaces, as a substantially continuous coating, dense, amorphous silica followed by, optionally, the deposition of alumina on the silica. A typical process for the production of such pigments involves slurrying the base particles in an aqueous medium and depositing amorphous silica on them from an aqueous sodium silicate solution at a pH above 6 and a temperature above 60°C. Optionally, then, an aqueous solution of an aluminum-containing compound may be added to the resulting suspension of silica-coated base particles with continued heating above 60°C., whereby alumina is deposited on the silica coating. Such coated pigments are particularly advantageous in the plastics and paint industries.

Apart from the selection of the primrose chrome yellow base, other materials involved in the silica encapsulation process and the processing conditions to be employed therewith are described in the Linton patent, the disclosure of which is incorporated herein by reference.

The quantity of silica to be applied in the pigment treatment can be varied over a considerable range depending on the intended end use of the pigment. In general the dense amorphous silica coating should be in the range of about 2 to 40 percent by weight of the final pigment. When alumina is also present, a convenient quantity thereof is 0.25 to 2 percent by weight of the final pigment although as much as 10 percent can be used without deleterious effect.

The products of the invention, particularly when silica-coated, are most advantageous when used in the formation of paints, printing inks, plastics and other products where outstanding thermal stability is desired.

The following examples illustrate this invention in detail. Parts and percentages as used therein are by weight unless otherwise stated.

EXAMPLE I

A. A solution of 347 grams lead nitrate, $Pb(NO_3)_2$, in 2,500 cc. of water at 26.7°C. is prepared and the pH of the solution is adjusted to 4.0 with addition of nitric acid.

B. A second solution, at 26.7°C., is prepared by dissolving in 1246 cc. of water containing 4 cc. of acetic acid:
- 28.5 grams $Na_2Cr_2O_7.2H_2O$
- 93 grams $Na_2CrO_4$
- 15.8 grams $Na_2SO_4$
- 1.7 grams $Na_4P_2O_7$ The pH of this solution is 6.7. To it is added, with stirring, 20 grams $Al_2(SO_4)_3.18H_2O$ dissolved in 80 cc. water, and water dilution is effected to a total volume of 2,500 cc. The pH of solution "B" is then 6.45.

Solution "B" is added, with stirring, over a 5-second period, to the lead nitrate solution "A." The pH is found to be 1.5 to 1.6, and adjustment upward to 4.3 is made by addition of 20 grams $Na_2CO_3$ dissolved in 80 cc. of water.

The resulting slurry is heated to 54°C. and held at this temperature for 12 minutes, after which there are added in sequence with intermittent 30-second stir periods, the following:
1. 8 grams $Na_2CO_3$ in 32 cc. water;
2. a solution comprising: 44.4 grams $Na_2SiO_3$ (Du Pont 20WW Grade) 2.4 grams 50% NaOH made up to 300 cc. with water (The pH of the slurry is found to be 8.5 to 8.6 at this point.);
3. 200 cc. of an aqueous solution containing 1.0 gram $MnSO_4.H_2O$;
4. 40 grams of $Al_2(SO_4)_3.18H_2O$ in 80 cc. of water; and
5. 13 grams $Na_2CO_3$ to adjust the pH of the slurry to 5.4.

The precipitate is recovered by filtration and water-washed $SO_4$-free, dried at 80°C. and baked 2 hours at 130°C. The $CO_2$ content of the pigment is about 0.18 percent by weight, calculated as $PbCO_3$.

The pigment is then silica-coated by the general procedure of Linton U.S. Pat. No. 3,370,971. Thus 150 grams of the pigment are slurried in 1,000 cc. water containing 20 grams sodium silicate (Du Pont 20 WW Grade). The slurry is passed through a Manton-Gaulin homogenizer at 5,000 psig. The homogenizer is washed out with 100 cc. water and the pH is 10.5.

The homogenized slurry is heated to 90°C. and the pH adjusted to 8.0. This temperature is maintained while the following treatment steps are carried out:

Over a 4-hour period, at a uniform rate, there is added a solution of 115 grams $Na_2SiO_3$ (Du Pont 20WW Grade) in 600 cc. water. Simultaneously, but over a 5-hour period, there is added, at a uniform rate, a solution of 17.3 grams of 98% $H_2SO_4$ in 800 cc. water. The pH of the treated slurry is found to be 5.8, and this is adjusted to 9.0 by addition of 5% NaOH solution. The pigment is then coagulated by addition of two solutions with an intervening two-minute stirring period of:

Solution 1: K Wood Rosin 20 grams NaOH 2.7 grams in 180 ml $H_2O$ (Mixture heated to the boil to dissolve)

Solution 2: $CaCl_2.2H_2O$ 9 grams in 50 ml $H_2O$.

The slurry is stirred for 5 minutes, filtered, washed and dried at 90°C., and micropulverized.

A silica-coated pigment labeled as I and produced by the general procedure given above is tested for heat stability in a polystyrene molding versus a commercial prereduced primrose chrome yellow pigment, also coated with silica in the manner given above, as a "Control." The chrome yellow base of the Control pigment contains antimony as a prereducing metal and contains $CO_2$ in amounts of about 0.8 to 2.4 percent, calculated as $PbCO_3$ (depending upon the particular lot employed). The pigments are compounded at the 1 percent level with polystyrene and portions molded at 400°F. and 600°F. Spectrophotometric curves of the two materials are made to show the color intensity of each.

The Sample I pigment is clearly superior in thermal stability as color intensity changes upon heating to less of an extent than does the Control. The superiority is apparent at 400°F. but is even more pronounced at 600°F. It is noted that the superiority is demonstrated in spite of the fact that the Control sample had been chemically prereduced to improve its thermal stability.

EXAMPLE II

In this case the preparation of the primrose base is the same as given in Example I except that solution "B" is prepared as follows:

| There is dissolved in 1200 cc. $H_2O$ | |
|---|---|
| $Na_2SO_4$ | 15.8 grams |
| $Al_2(SO_4)_3 \cdot 18H_2O$ | 20 grams dissolved in 80 cc. of water |
| $Na_4P_2O_7$ | 1.7 grams dissolved in 200 cc. of water |
| Glacial Acetic Acid | 4 cc. |
| $Na_2Cr_2O_7 \cdot 2H_2O$ | 28.5 grams |
| $Na_2CrO_4$ | 93 grams |

The above is then diluted to 2,500 ml, and a pH of 6.6 is recorded.

This base pigment is also silica-coated by the general procedure of Example I to produce a pigment also rated excellent for thermal stability.

EXAMPLE III

In this case the preparation of the primrose base is also the same as given in Example I but in step (5) the pH is adjusted to 4.9 instead of 5.4 to improve filterability. The coating of the base pigment with dense silica is as follows:

A 150 gram portion of the pigment is slurried in 450 cc. water containing 20 grams sodium silicate (Du Pont No. 9 Grade). The slurry is passed through a Manton-Gaulin homogenizer at 2,000 psig., the homogenizer washed out with 150 cc. water, a second pass is then made through the homogenizer at 5,000 psig., and a washing then made with 640 cc. water. The pH of final slurry is 10.5.

The homogenized slurry is thereafter heated to 90°C. and the pH adjusted to 9.0. This temperature is maintained while the following treatment steps are carried out:

Over a 3-hour period, at a uniform rate, there is added a solution of 115 grams $Na_2SiO_3$ (Du Pont No. 9 Grade) in 540 cc. water. Simultaneously, but over a 3¾-hour period, there is added, at a uniform rate, a solution of 17.3 grams of 98% $H_2SO_4$ in 735 cc. water. To the slurry there is added 11 grams alum dissolved in 50 cc. water, giving a pH of 3.5 to 3.8. Then the pH is adjusted to 4.2 to 4.5 with 5% NaOH solution. Finally the slurry is stirred for 5 minutes, filtered, washed and dried at 104°C., and micropulverized.

Again the pigment is rated excellent in terms of thermal stability.

What is claimed is:

1. A process for the production of a primrose yellow shade pigment consisting essentially of 0.5 to 10 weight percent of one or more hydrous oxides selected from the group consisting of alumina, titania and zirconia, and 90 to 99.5 weight percent of an orthrhombic phase lead chromate-lead sulfate solid solution consisting essentially of 40 to 85 weight percent of lead chromate and 15 to 60 weight percent of lead sulfate, said solid solution containing no more than about 0.35 weight percent of $CO_2$, calculated as $PbCO_3$ by:
   a. admixing a first aqueous solution containing a soluble lead salt and having a pH of 3.8 to 4.2 with a second aqueous solution having a pH of 6.5 to 7 and containing chromate and sulfate ions, the admixing being conducted in the presence of a combination of acetic acid, $Al^{+3}$ ions, and $P_2O_7^{-4}$ ions to precipitate the solid solution as a stable orthorhombic crystal phase, the composition of the two solutions being selected to produce the solid solution composition in the form of a slurry having a pH of 1.4 to 2,
   b. adjusting the pH of the aqueous slurry thus formed to 4 to 6 and maintaining it at an elevated temperature of 40° to 80°C. for at least 5 minutes,
   c. thereafter surface-coating the precipitate with 0.5 to 10 percent, based on the final pigment weight of at least one hydrous oxide selected from the group consisting of alumina, titania and zirconia to further enhance light-fastness, and
   d. filtering the surface-coated precipitate, washing it free of residual ions, drying it and then heating the pigment for a minimum of 15 minutes to a temperature of at least 110°C. to maximize lightfastness.

2. A chrome yellow pigment of the primrose type having excellent color intensity and improved thermal stability characteristics, said pigment consisting essentially of 0.5 to 10 weight percent of one or more hydrous oxides, selected from the group consisting of alumina, titania and zirconia, and 90 to 95.5 weight percent of an orthorhombic phase lead chromate-lead sulfate solid solution consisting essentially of 40 to 85 weight percent of lead chromate and 15 to 60 weight percent of lead sulfate, said solid solution containing no more than about 0.35 weight percent of $CO_2$, calculated as $PbCO_3$.

3. A chrome yellow pigment according to claim 2 wherein the hydrous oxide is alumina.

4. A chrome yellow pigment of the primrose type having excellent color intensity and improved thermal stability characteristics, said pigment consisting essentially of 90 to 99.5 weight percent of an orthorhombic phase lead chromate-lead sulfate solid solution consisting essentially of 40 to 85 weight percent of lead chromate and 15 to 60 weight percent of lead sulfate, said solid solution containing no more than about 0.35 weight percent of $CO_2$, calculated as $PbCO_3$, and 0.5 to 10 weight percent of a surface-coating consisting essentially of one or more hydrous oxides selected from the group consisting of alumina, titania and zirconia, said pigment being encapsulated with about 2 to 40 weight percent, based on the weight of the encapsulated pigment, of dense amorphous silica.

* * * * *